(12) United States Patent
Ziv et al.

(10) Patent No.: US 11,086,978 B2
(45) Date of Patent: Aug. 10, 2021

(54) TRANSACTION AUTHENTICATION BY A TOKEN, CONTINGENT ON PERSONAL PRESENCE

(75) Inventors: Aran Ziv, Herzliya (IL); Mordechai Teicher, Hod Hasharon (IL)

(73) Assignee: Western Digital Israel Ltd, Kfar Saba (IL)

( * ) Notice: Subject to any disclaimer, the term of this patent is extended or adjusted under 35 U.S.C. 154(b) by 1564 days.

(21) Appl. No.: 11/434,818

(22) Filed: May 17, 2006

(65) Prior Publication Data
US 2006/0265340 A1 Nov. 23, 2006

Related U.S. Application Data

(60) Provisional application No. 60/682,345, filed on May 19, 2005.

(51) Int. Cl.
*G06F 21/34* (2013.01)
*G06F 21/35* (2013.01)
(Continued)

(52) U.S. Cl.
CPC .............. *G06F 21/34* (2013.01); *G06F 21/31* (2013.01); *G06F 21/32* (2013.01); *G06F 21/35* (2013.01);
(Continued)

(58) Field of Classification Search
CPC .................. G06Q 20/00–425; G06F 21/00–88
See application file for complete search history.

(56) References Cited

U.S. PATENT DOCUMENTS 5,241,594 A * 8/1993 Kung ............................. 713/151
5,432,851 A * 7/1995 Scheldt et al. ................ 713/184
(Continued)

FOREIGN PATENT DOCUMENTS

CN      1610911 A       4/2005
WO    01/57625 A2       8/2001
(Continued)

OTHER PUBLICATIONS

International Search Report for application No. PCT/IL06/00583 dated Aug. 20, 2007 (3 pages).
(Continued)

*Primary Examiner* — Mohammad A. Nilforoush
(74) *Attorney, Agent, or Firm* — Brinks Gilson & Lione

(57) ABSTRACT

To authorize a transaction between a host and a server, a token is operationally connected to the host. The host receives an identification credential of a user. The identification credential is verified by the token and/or by the server. If the token detects a prescribed human action, the token generates token authentication data and the host sends the token authentication data to the server. Upon receiving the authentication data, the server authenticates the transaction. A device for authenticating a transaction includes a device interface for interacting with a host, a connector for reversibly operationally connecting the device to the host, and a controller that authenticates the transaction only once, contingent on detecting a prescribed anonymous human action. One such human action is providing one or more inputs at the host's user interface synchronously with outputs at the device's user interface.

12 Claims, 7 Drawing Sheets

(51) Int. Cl.

| | | |
|---|---|---|
| *G06F 21/31* | (2013.01) | |
| *G06Q 20/40* | (2012.01) | |
| *G06F 21/32* | (2013.01) | |
| *G06Q 20/34* | (2012.01) | |
| *G06Q 20/38* | (2012.01) | |
| *G06Q 30/06* | (2012.01) | |
| *G07F 7/10* | (2006.01) | |

(52) U.S. Cl.
CPC .......... *G06Q 20/341* (2013.01); *G06Q 20/40* (2013.01); *G06Q 20/4014* (2013.01); *G06Q 20/40145* (2013.01); *G06F 2221/2115* (2013.01); *G06F 2221/2133* (2013.01); *G06Q 20/3821* (2013.01); *G06Q 30/06* (2013.01); *G06Q 30/0601* (2013.01); *G07F 7/1008* (2013.01)

(56) References Cited

U.S. PATENT DOCUMENTS

| | | | | |
|---|---|---|---|---|
| 5,621,912 | A * | 4/1997 | Borruso et al. | 718/1 |
| 6,607,136 | B1 * | 8/2003 | Atsmon et al. | 235/492 |
| 7,149,899 | B2 * | 12/2006 | Pinkas et al. | 713/182 |
| 7,337,324 | B2 * | 2/2008 | Benaloh et al. | 713/182 |
| 7,533,411 | B2 * | 5/2009 | Goodman et al. | 726/21 |
| 7,861,091 | B2 * | 12/2010 | Kuo | G06F 21/6218 |
| | | | | 713/185 |
| 8,112,483 | B1 * | 2/2012 | Emigh et al. | 709/206 |
| 8,473,336 | B1 * | 6/2013 | Simmons | 705/14.1 |
| 2001/0001014 | A1 | 5/2001 | Akins, III et al. | |
| 2001/0054148 | A1 * | 12/2001 | Hoornaert et al. | 713/172 |
| 2002/0091937 | A1 * | 7/2002 | Ortiz | 713/200 |
| 2003/0028435 | A1 | 2/2003 | Gaillard | |
| 2003/0087601 | A1 * | 5/2003 | Agam et al. | 455/39 |
| 2004/0024817 | A1 * | 2/2004 | Pinkas | 709/203 |
| 2004/0236819 | A1 * | 11/2004 | Anati et al. | 709/200 |
| 2004/0254793 | A1 * | 12/2004 | Herley et al. | 704/270 |
| 2005/0010784 | A1 | 1/2005 | Ito et al. | |
| 2005/0015607 | A1 * | 1/2005 | Ellingsen | G11B 20/00876 |
| | | | | 713/193 |
| 2005/0033702 | A1 | 2/2005 | Holdsworth | |
| 2005/0065802 | A1 * | 3/2005 | Rui et al. | 705/1 |
| 2005/0193208 | A1 * | 9/2005 | Charrette et al. | 713/182 |
| 2005/0228770 | A1 * | 10/2005 | Willamson et al. | 707/1 |
| 2005/0239447 | A1 * | 10/2005 | Holzman et al. | 455/414.3 |
| 2005/0283444 | A1 | 12/2005 | Ekberg | |
| 2006/0032905 | A1 * | 2/2006 | Bear et al. | 235/380 |
| 2006/0195604 | A1 * | 8/2006 | Goodman et al. | 709/232 |

FOREIGN PATENT DOCUMENTS

| | | |
|---|---|---|
| WO | WO 03/044721 | 5/2003 |
| WO | WO 03/071403 | 8/2003 |

OTHER PUBLICATIONS

Written Opinion for application No. PCT/IL06/00583 dated Aug. 20, 2007 (4 pages).
Supplementary European Search Report issued in European Application No. 06728358.0, dated Apr. 8, 2010, (7 pages).
Office Action dated Feb. 24, 2011 in corresponding EP Appln. No. 06728358.0 (6 pgs).
Office Action dated Oct. 24, 2011 in corresponding Chinese Appln. No. 200680017118.9 (12 pgs).
Office Action dated Nov. 18, 2011 in corresponding Japanese Appln. No. 2008-511863 (9 pgs).
Office Action from corresponding Japanese Appln. No. 2008-511863 dated Nov. 19, 2010 (2 pgs) (translation).
Office Action dated Apr. 2, 2014 in Corresponding EP Application No. 06 728 358.0.

* cited by examiner

TRANSACTION AUTHENTICATION BY A
TOKEN, CONTINGENT ON PERSONAL
PRESENCE

This patent application claims the benefit of U.S. Provisional Patent Application No. 60/682,345, filed May 19, 2005

FIELD AND BACKGROUND OF THE INVENTION

The present invention relates to a hardware token for authenticating a transaction over a communication network.

The Internet and mobile communication networks are used more and more for financial transactions, primarily in the context of electronic commerce. In most transactions the identity of the person requesting the transaction must be verified. Communication networks are often insecure, and malicious software has become commonplace. As a result, one's personal computer and cellular phone are not considered trusted, and anything keyed into a personal computer or a cellular phone, as well as anything communicated using such devices, is exposed to hacking by others. The result is billions of dollars of yearly damages from fraudulent transactions, borne by consumers, merchants and financial institutions.

To provide more secure identification, specialized electronic hardware, in the form of a "token" or "smart card", has been developed. Such hardware combines tamper-resistant construction and cryptography to satisfactorily withstand reasonable attacks. Techniques known as "challenge-and-response", "one-time-password" or "time-dependent-key" ensure that even if a transaction session with a token is intercepted, the session cannot be reused for another transaction.

Thus, when a token issued by a financial institution is connected to a personal computer, e.g. through a USB interface or using a smart card reader, an authentication session between the financial institution's server and the personal computer satisfactorily validates the authenticity of the token. As part of the validation, the token sends token authentication data to the server. Such validation of the authenticity of the token is termed herein "authentication" of the token. However, it is the authenticity of the owner of the token, not that of the token, that really matters. This leaves two loopholes still open for misuse of the token: 1) if the token is physically lost or stolen, it can be used to steal the identity of its legitimate holder; and, 2) a malicious program in a computer can operate a token connected to the computer to falsely generate transactions in favor of a criminal. To overcome the first loophole, security providers have developed multi-factor authentication paradigms combining "what you have" (i.e. the token) with at least one of "what you know" (e.g. a PIN code) and "what you are" (e.g. a biological attribute such as a fingerprint).

The scenario of a computer operating under the control of a malicious program relates to either one's own computer infected by a virus, or a public computer in an Internet café or office services bureau. In both cases, a PIN entered through the computer's keyboard or a fingerprint image read by a device connected to the personal computer, can be intercepted by the malicious program and then reused for activating a token for false transactions. This risk is greatly increased if a token is inserted to a host for an extended time, which may happen when a token forms part of a multipurpose device, e.g. a USB flash memory key, which may be left connected to a computer for hours. An effective remedy to such vulnerabilities is to incorporate a PIN pad or fingerprint reader within the token itself or within a multipurpose device that includes the token. However, such addition makes the token both bulkier and more expensive, and is thus undesirable in many cases.

An alternative way to detect the presence of a human is called "CAPTCHA". See e.g. http://www.captcha.net. A user is required to type a random string that is presented graphically to the user using a font that is legible to humans but illegible to a malicious program. The weak point of this technique is the so-called "man-in-the-middle" attack, in which the malicious program sends the CAPTCHA graphics to a human accomplice located elsewhere.

There is thus a widely recognized need for, and it would be highly advantageous to have, a way to protect an authentication token connected to a computer from being hijacked by a malicious program, without requiring that the token includes an input device for receiving a PIN or for turning a biological attribute of the user into a biometric signature.

SUMMARY OF THE INVENTION

The present invention seeks to provide systems and functionalities for protecting an authentication token connected to a computer from being hijacked by a malicious program, without requiring that the token includes an input device for receiving a PIN or for measuring biological attributes. More specifically, the present invention seeks to protect the user of a token from unintentional and unnoticeable authentication sessions conducted by a malicious program that runs on the user's computer and exploits a token connected to the computer in cooperation with a PIN intercepted by the malicious program during a previous legitimate authentication session.

By "token" is meant a portable device that includes data and/or processing power for authenticating a unique identity associated with the device. Exemplary form factors for a token include a smart card, a USB key, and an expansion card for a telephone or handheld computer. A token can be a standalone device, or form part of another device such as a USB flash memory disk.

By "host" is meant a processing and communication device for executing transactions with a "server" of a "provider" that is typically a merchant or financial institution. Examples of hosts include personal desktop or laptop computers, cellular telephones, two-way pagers and handheld computers.

By "user" is meant a person, representing him/herself or operating on behalf of an organization, who wishes to carry out a transaction with a provider and whose identity needs to be authenticated in order to execute the transaction.

By "transaction" is meant a business process between a user and a provider that involves mutual commitments of the parties.

By "personal identification number" or "PIN" is meant a secret numerical string known to a person and serving to authenticate that person. According to one common paradigm, the PIN is known only to the user and the provider; according to an alternative common paradigm, the PIN is known only to the user and his/her token, thus serving to unlock the token. "Password" or "pass phrase" are similar to PIN in their purpose, but usually include also alphabetic characters and symbols. Thus, a PIN is a special case of a password. A "biological attribute" is a feature characteristic of one's body (e.g. a fingerprint or an iris pattern) that is read and digitized by an appropriate sensor. The digital data thus produced by the sensor is termed herein a "biometric signature". By "user identification" is meant receiving and verifying any of PIN, password or biometric signature. A PIN, a password and a biometric signature are examples of identification credentials. By "identification credential" is meant data that are expected to be received only from a person who is authorized to request a transaction: either "what you know" (e.g. password or PIN) or "what you are" (e.g., biometric signature).

By "authorization" is meant the reliable validation of a user's identity through the combination of information from a token and user identification. Either the combination of information from a token and user identification reaches the provider's server as two separate, mandatory pieces of information, or the user identification is verified locally and is used locally to unlock and activate the token, and only the information from the token is then checked by the provider's server (or by dedicated hardware or by an authentication service associated with the provider's server).

By "malicious program" is meant software code that has been fraudulently installed on a host with the purpose of generating fraudulent transactions through false authentication. It is presumed that the malicious program is capable of intercepting a PIN, password or biometric signature entered through an input device connected to the host (such as a conventional keyboard or a fingerprint reader), as well as accessing a token connected to the host.

By a "prescribed human action" is meant an action that can be made only by a person and that is defined for a specific purpose to the exclusion of machine-generated actions that could serve the same purpose. For example, the purpose of the prescribed human actions of the present invention is the detection, by a token connected to a host, of the presence of a person. This can be accomplished, for example, by requesting the removal and reconnection of the token, or by equipping the token with a button that must be pushed to verify the presence of the person.

By "anonymous interaction" is meant an interaction, by a person, with a device or system, whose performance does not require the person to be in possession of restricted knowledge, such as a PIN or a password, that identifies the person, and does not require the person to have a property such as a biological feature that is specific to the person and identifies the person. Thus, an anonymous interaction verifies the presence of a person but does not identify the person.

An object of the present invention is to prevent a malicious program, on a host, that has intercepted user identification data entered in a legitimate transaction, from transparently generating transactions and falsely authorizing the transactions on behalf of the user.

The goal of the present invention could be accomplished by embedding a keypad and/or fingerprint sensor in the token's body, but such additions make the token bulkier and more expensive. The present invention thus aims at achieving the object described above without using a PIN/password keypad or biometric sensor embedded in the token.

Therefore, according to the present invention there is provided a method of authorizing a transaction, between a host and a server, that is initiated by a user of the host, including the steps of: (a) operationally connecting a token to the host; (b) receiving an identification credential of the user, by the host; (c) verifying the identification credential, by at least one device selected from the group consisting of the token and the server; (d) detecting a prescribed human action, by the token; (e) generating token authentication data, by said token, contingent on the detecting; (f) sending the token authentication data to the server, by the host; and (g) authorizing the transaction, by the server, contingent on receiving the token authentication data.

Furthermore, according to the present invention there is provided a device for authenticating a transaction between a host and a server, including: (a) a device interface for interacting with a host; (b) a connector for reversibly operationally connecting the device interface to the host; and (c) a controller operative, upon receipt of a transaction authentication request from the host via the device interface, to authenticate the transaction only once, contingent detection by the controller of a prescribed anonymous human action.

Furthermore, according to the present invention there is provided a method of confirming, to a peripheral device that is operationally connected to a host, by a person, that the person is present, including the steps of: (a) providing the host with a host-user input interface; (b) providing the peripheral device with a device-user output interface; (c) generating at least one output at the device-user output interface, by the peripheral device; (d) for each at least one output, monitoring the host-user input interface, by the host, for a corresponding input; and (e) reporting each corresponding input to the peripheral device, by the host, the presence of the person being confirmed only if each report is received by the peripheral device.

Furthermore, according to the present invention there is provided a device for authenticating a transaction between a host and a server, including: (a) a device interface for interacting with the host; (b) a user interface; and (c) a controller operative, upon receipt of a transaction authentication request from the host via the device interface, to validate the server and to indicate, via the user interface, a success of the validating.

Furthermore, according to the present invention there is provided a method of authenticating a transaction between a host and a server, including the steps of: (a) operationally connecting a token to the host; (b) validating the server, by the token; and (c) indicating a success of the validating, by the token, via a user interface of the token.

The first method of the present invention is a method of authorizing a transaction, between a host and a server, that is initiated by a user of the host. According to the basic method, a token is operationally connected to the host. The host receives an identification credential of the user. The identification credential is verified, either by the token, or by the server, or by both the token and the server. To be sure that the identification credential has not been generated by a malicious program running on the host, the token generates token authentication data only if the token detects a prescribed human action. Then the host sends the token authentication data to the server. If the server receives the token authentication data, the server authorizes the transaction.

Preferably, the identification credential received by the host is a password such as a PIN, or alternatively is a biometric signature.

Preferably, the prescribed human action detected by the token includes an interaction, between the person and the token, that is effected at least in part while the token is operationally connected to the host. That the interaction must be performed at least in part while the token is operationally connected to the host excludes, from the scope of the definition of the interaction, merely operationally connecting the token to the host without first disconnecting the token from the host. Note that in this context operationally disconnecting the token from the host is considered to be an operation that is performed while the token is operationally connected to the host, because at the start of the operation the token is in fact operationally connected to the host.

Although the scope of the present invention includes an interaction that identifies the person, for example via receipt of an identification credential, the identification credential is received by the host rather than by the token, so that the token need not include a bulky and costly user interface such as a keypad or a biometric sensor. Nevertheless, equipping the token with a small, inexpensive user interface, such as a button or a LED, for detecting the presence of a person without identifying the person, is within the scope of the present invention. The combination of user identification via a host user interface with anonymous user presence detection by the token via a minimal token user interface is a key element of the present invention.

Preferably, the anonymous interaction is a direct interaction between the person and the token. That the interaction is "direct" means that it is not mediated by another entity, such as the host. Examples of such direct interactions include operationally disconnecting the token from the host and then operationally reconnecting the token to the host and anonymously manipulating a (minimal) user interface with which the token has been configured. Another such direct interaction requires that the token be provided with a user interface that signals that the token is about to generate the authentication data. The associated interaction is leaving the token operationally connected to the host for at least a predetermined time subsequent to the signaling.

Alternatively, the anonymous interaction is mediated by the host rather than being directly with the token. An example of such a mediated interaction, with a token configured with a user interface, is interacting with the host, for example by pressing a key on a keyboard of the host, so that the host receives a corresponding user input substantially synchronously with each of at least one signal, but preferably substantially synchronously with each of a plurality of signals, from the user interface of the token. Upon receiving the input(s), the host immediately reports the receipt of the input(s) to the token. Receipt of these reports substantially synchronously with the generation of the corresponding signals constitutes detection by the token of the prescribed human action. "Synchronicity" in this context is defined in terms of normal human reaction times. For example, pressing a key within a second after hearing a signal is synchronous with the signal, whereas pressing a key twenty seconds after hearing a signal is not synchronous with the signal.

Preferably, the method also includes providing the token with a user interface, validating the server by the token, and indicating, by the token, whether the validation has succeeded. The prescribed human action then is contingent on the validation succeeding: if the validation fails, the user refrains from interacting with the token.

A basic first device of the present invention, for authenticating a transaction between a host and a server, includes a device interface for interacting with the host; a connector for reversibly operationally connecting the device to the host; and a controller that, upon receipt of a transaction authentication request from the host via the device interface, authenticates the transaction only once and only upon detection by the controller of a prescribed anonymous human action.

One example of such a prescribed human action is operational connection of the device interface to the host within a predetermined time interval prior to the authentication request being received. This condition is detected via the device interface.

Other examples of prescribed human actions require that the device also include a user interface. One such example is interaction with the user interface to allow the authentication. Another such example is leaving the device interface operationally connected to the host for at least a predetermined time subsequent to the user interface indicating that the authentication request has been received. Another such example is interacting with the host substantially synchronously with each of at least one signal from the user interface, but preferably with each of a plurality of signals from the user interface. In the latter example, detecting the prescribed human action by the controller includes the controller receiving, from the host, notification of the interaction.

Preferably, the authenticating by the controller also is contingent on receipt, by the controller, via the device interface, of an identification credential (e.g. a password, a PIN or a biometric signature) that has been entered at the host and on verification of the identification credential by the controller.

Preferably, the device also includes a user interface, and the controller also is operative to validate the server and to indicate, via the user interface, whether the validation of the server has succeeded.

Preferably, the device also includes a functional component, such as a memory, for providing functionality, such as storing data received from the host via the device interface, that is not related to the authentication of the transaction. More preferably, when the device interface is operationally connected to the host: if an authentication request is pending, the controller handles the authentication request, either by satisfying the authentication request because the required condition was satisfied or by denying the authentication request because the required condition was not satisfied, without providing the functionality to the host; otherwise, if no authentication request is pending, the controller provides the functionality to the host. Most preferably, subsequent to handling the authentication request, when the controller receives via the device interface a request to provide the functionality to the host, the controller prompts a user to operationally disconnect the device interface from the host and then to operationally reconnect the device interface to the host. Also most preferably, if the controller receives the authentication request while providing the functionality to the host, the controller prompts the user to operationally disconnect the device interface from the host and then to operationally reconnect the device interface to the host.

Alternatively, subsequent to handling the authentication request, when the controller receives via the device interface a request to provide the functionality to the host, the controller starts to provide the functionality to the host. If the controller receives the authentication request while providing the functionality to the host, the controller stops providing the functionality to the host and instead handles the authentication request.

Another method of the present invention is a method of confirming, to a peripheral device such as a token that is operationally connected to a host, by a person, that the person is in fact present. According to the basic method, the host is provided with a host-user input interface; the peripheral device is provided with a device-user output interface; the peripheral device generates at least one output at the device-user output interface; and, for each output, the host monitors the host-user input interface for a corresponding input and reports the input(s) to the peripheral device. The presence of the person is confirmed only if the peripheral device does in fact receive (a) corresponding report(s). In this context, an "input interface" is an interface such as a button or a keyboard for receiving input from a user and an "output interface" is an interface such as a LED or a display screen for providing output to a user. In practice, the hosts to which this method is applied almost always include both input interfaces and output interfaces, but only the input interfaces of the hosts are use by the method. The peripheral device may or may not include an input interface, but must include an output interface.

Preferably, the peripheral device generates a plurality of such outputs, that most preferably are distributed randomly in time. Also preferably, the presence of the person is confirmed only if each report is received by the peripheral device substantially synchronously with the generation of the corresponding output by the host.

A second device of the present invention also is a device for authenticating a transaction between a host and a server. The device includes a device interface for interacting with the host, a user interface and a controller. When the controller receives a transaction authentication request from the host via the device interface, the controller validates the server and uses the user interface to indicate whether the validation of the server succeeded.

A third method of the present invention, for authenticating a transaction between a host and a server, corresponds to the second device. A token, that is operationally connected to the host, validates the server and, indicates via its user interface whether the validation succeeded.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a token that can be used to authenticate a user without the token having to directly receive information specific to the user.

The principles and operation of a token according to the present invention may be better understood with reference to the drawings and the accompanying description.

Figure 1:
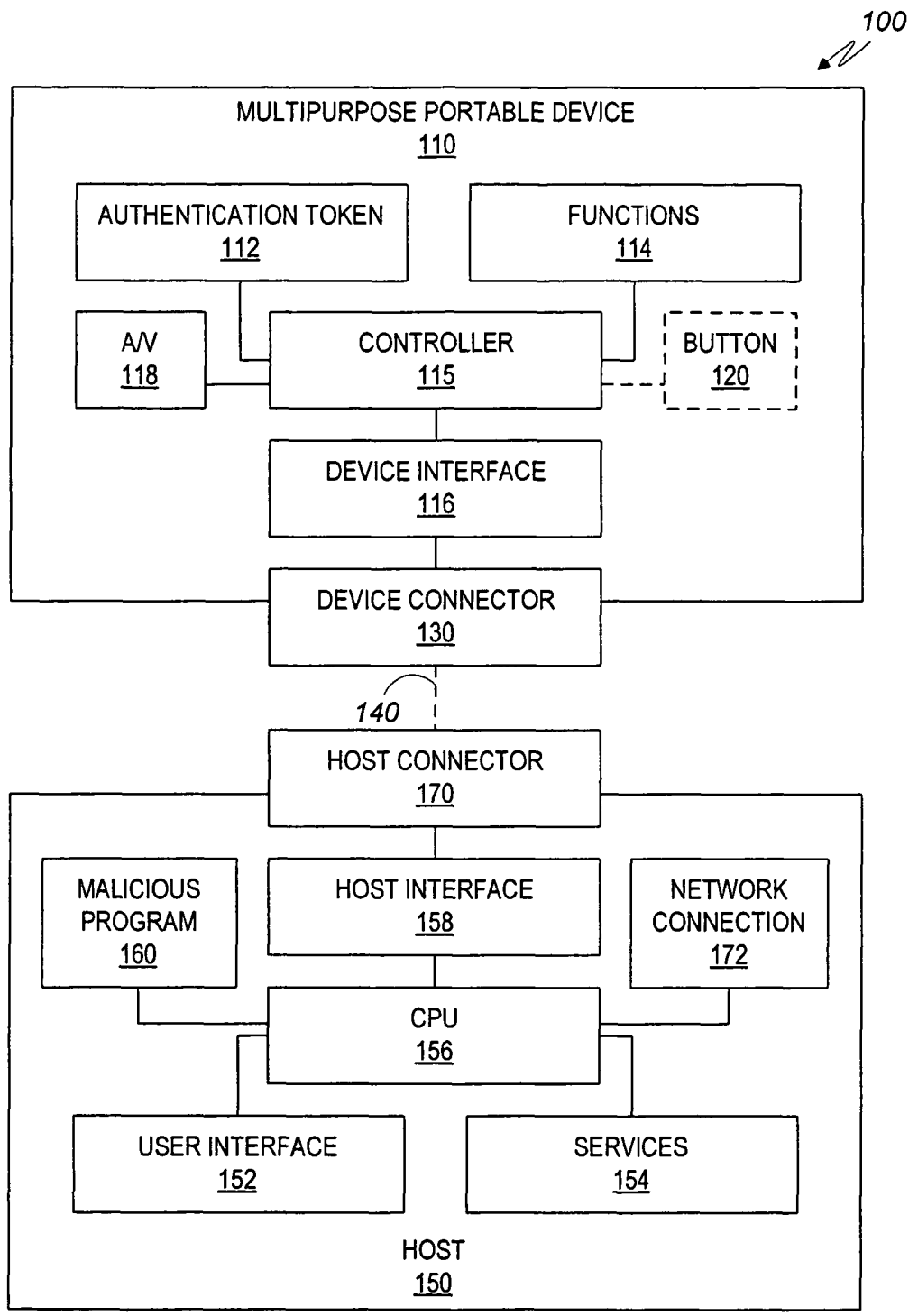
FIG. 1 is a high-level block diagram of a system of the present invention.

Referring now to the drawings, FIG. 1 illustrates a preferred embodiment 100 of a system constructed in accordance with the present invention, relating to an authentication token 112 that forms part of a multipurpose portable device 110. Multipurpose portable device 110 combines token functionality of authentication token 112, with other functions 114, such as storage. A controller 115 governs the operation of multipurpose portable device 110 and controls both authentication token 112 and functions 114. An indicator 118 provides audio and/or visual signals to the user under the control of controller 115. A button 120 is optional, for providing an approval signal by the user. Button 120 can be a physical pushbutton, or alternatively a light sensor that cooperates with indicator 118; for example, if the user touches the body of multipurpose portable device 110, his/her finger may reflect light coming from indicator 118 to be sensed by a light-sensitive sensor that forms part of button 120. A device interface 116 is the device side of a standard electrical and logical interface such as a USB (universal serial bus) interface or a SD (secure digital) interface. A device connector 130 provides either a wired connection or a wireless connection through a link 140 to a host 150.

Host 150, such as a personal computer, cellular telephone or two-way pager, serves a user to make transactions with a remote server of a provider (not shown) through a network connection 172 such as a connection to the Internet or a cellular link. A CPU 156 controls the operation of host 150 under services 154 that are software programs such as an operating system, a word processor, communication programs etc. A user interface 152 that includes, for example, a keyboard, a fingerprint reader and/or a screen, is used by the user to operate host 150 and also to provide a PIN, password or a biometric signature for user identification. A host interface 158 provides the host side of a standard electrical and logical interface with multipurpose portable device 110, while a host connector 170 provides either wired or wireless connection through link 140 with multipurpose portable device 110. A malicious program 160 is presumed to reside in host 150 and intercept PINs, passwords and/or biometric signatures entered via user interface 152, and then to attempt to employ authentication token 112, when multipurpose portable device 110 is connected to host 150, to generate false transactions that impersonate the legitimate owner of multipurpose portable device 110.

Figure 2:
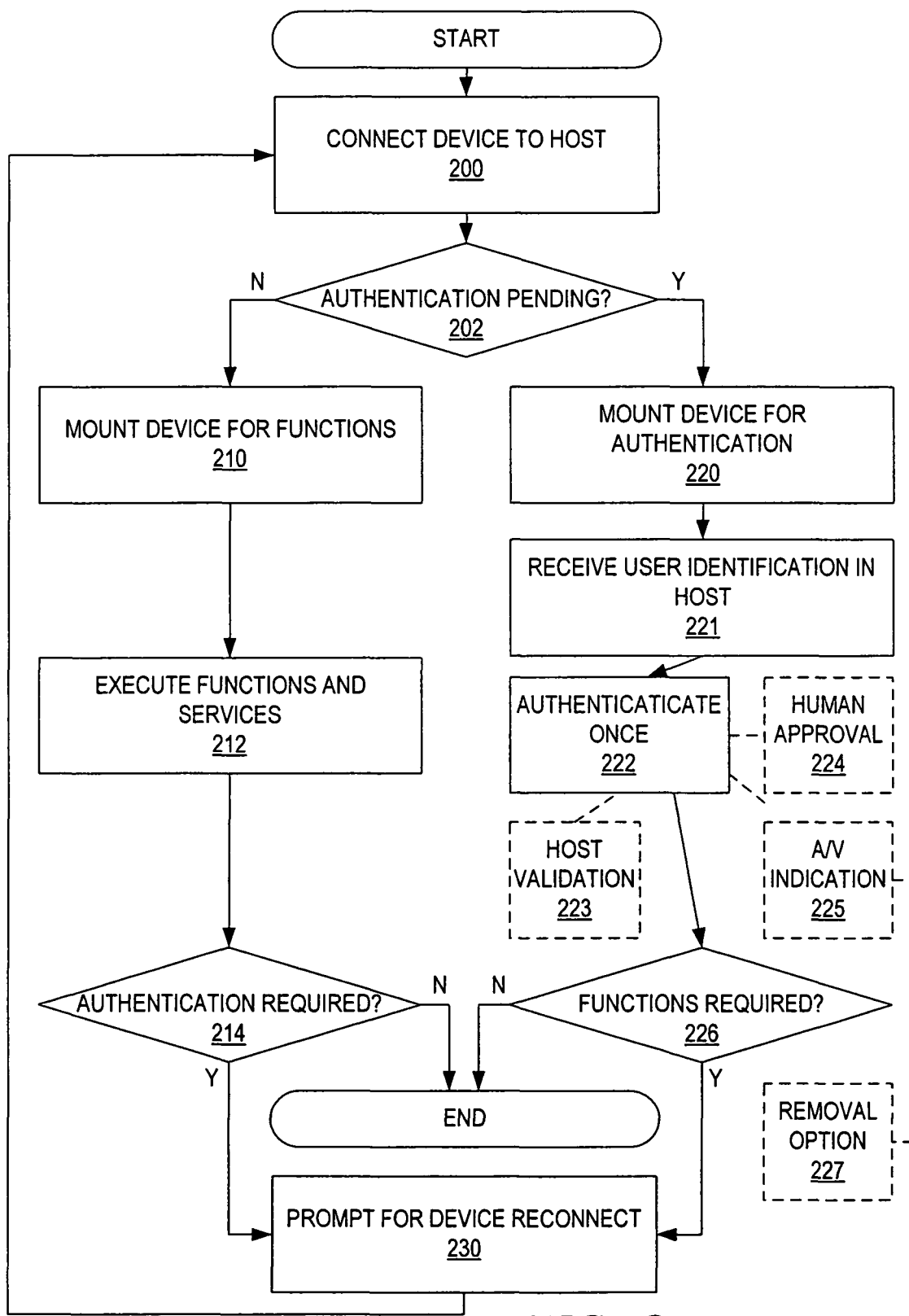
FIGS. 2 and 2A are flow charts of two methods of operating the system of FIG. 1.

FIG. 2 is a flow chart of a first preferred method for the operation of multipurpose portable device 110 of FIG. 1. As noted above, the primary purpose of the present method is to prevent malicious program 160 from generating false transactions while multipurpose portable device 110 is connected to host 150 for the purpose of functions 114, such as when a multipurpose portable device 110 which includes a storage functionality in functions 114 is connected to host 150 for a long time for storage purposes. In step 200, multipurpose portable device 110 is operationally connected to host 150. As part of the connection, there is a logical handshaking between device interface 116 and host interface 158 that allows controller 115 to identify at step 202 whether host 150 is in the middle of a pending authentication session. If the answer is negative, then in step 210 controller 115 mounts multipurpose portable device 110 for the functionalities of functions 114 alone, i.e. authentication token 112 is disconnected and is inaccessible to host 150. In step 212 host 150 performs services 154 and/or cooperates with functions 114 of multipurpose portable device 110 (for example, performing read and write operations on a data storage device included among functions 114), while authentication token 112 is disabled. It will be appreciate that malicious program 160 cannot perform any authentication transactions at this stage since authentication token 112 is disconnected. If one of the services requires authentication, this is detected in step 214, which leads to step 230 wherein the user is prompted by host 150 to remove multipurpose portable device 110 from host 150 and then reconnect multipurpose portable device 110 to host 150, which is a manual action that requires human intervention and cannot be performed by malicious program 160. Only if the user cooperates with step 230 does system 100 moves back to step 200, but this time with host 150 waiting for an authentication, as CPU 156 notifies host interface 158. At this time during the handshaking between multipurpose portable device 110 and host 150, step 202 identifies that there is a pending authentication and accordingly moves to step 220, wherein multipurpose portable device 110 is mounted for the functionality of authentication token 112, while functions 114 are disabled. In step 221 the user is prompted to present his/her PIN, password or identifying biological attribute to user interface 152, and in step 222 a single authentication session is executed, and authentication token 112 is afterwards disabled. If additional operations with functions 114 are desired at step 226, multipurpose portable device 110 needs to be reconnected, as prompted by step 230.

It will be appreciated that the procedure of FIG. 2 protects the owner of multipurpose portable device 110 from repeated, unnoticed false transactions made by malicious program 160 activating authentication token 112 on his or her behalf. However, there are still several loopholes that can be exploited by malicious program 160. These loopholes can be at least partially resolved by steps 223, 224, 225 and 227 of FIG. 2. A first loophole is by malicious program 160 preparing a false transaction in the background. Then, when the user connects multipurpose portable device 110 to host 150 for performing a function from among functions 114, the malicious program actually generates an authentication pending status in step 202, and performs a false transaction. The user will fail then in accessing his/her desired functions, since they have been disabled when moving to step 220 for authentication, but many users will just blame a hardware malfunction and will not notice the false transaction. To prevent this, an express human approval at step 224 is optionally required. This express approval can be provided by pressing button 120, or even through the host's user interface 152, under the method described in FIG. 5 below. Alternatively or additionally, in step 225 a special audio and/or visual signal is generated by indicator 118, to notify the user of a transaction so that the transaction is not unnoticed. Furthermore, the audiovisual signal can precede the authentication session by a few seconds, so that the user has time to remove multipurpose portable device 110 from host 150 in time to prevent the transaction, as represented by step 227. Another precaution can be taken against "phishing", wherein the user may be led to believe that s/he is doing transactions with a legitimate website, while s/he is connected to a different website. Phishing is prevented by host validation in step 223, wherein the authentication of step 222 is extended by including cryptographic verification of the identity of the provider's server connected through network connection 172, and signaling (e.g. by a special sound or a flashing green light) through indicator 118 that the host on the other side has been verified and its identity recorded by authentication token 112.

Figure 2A:
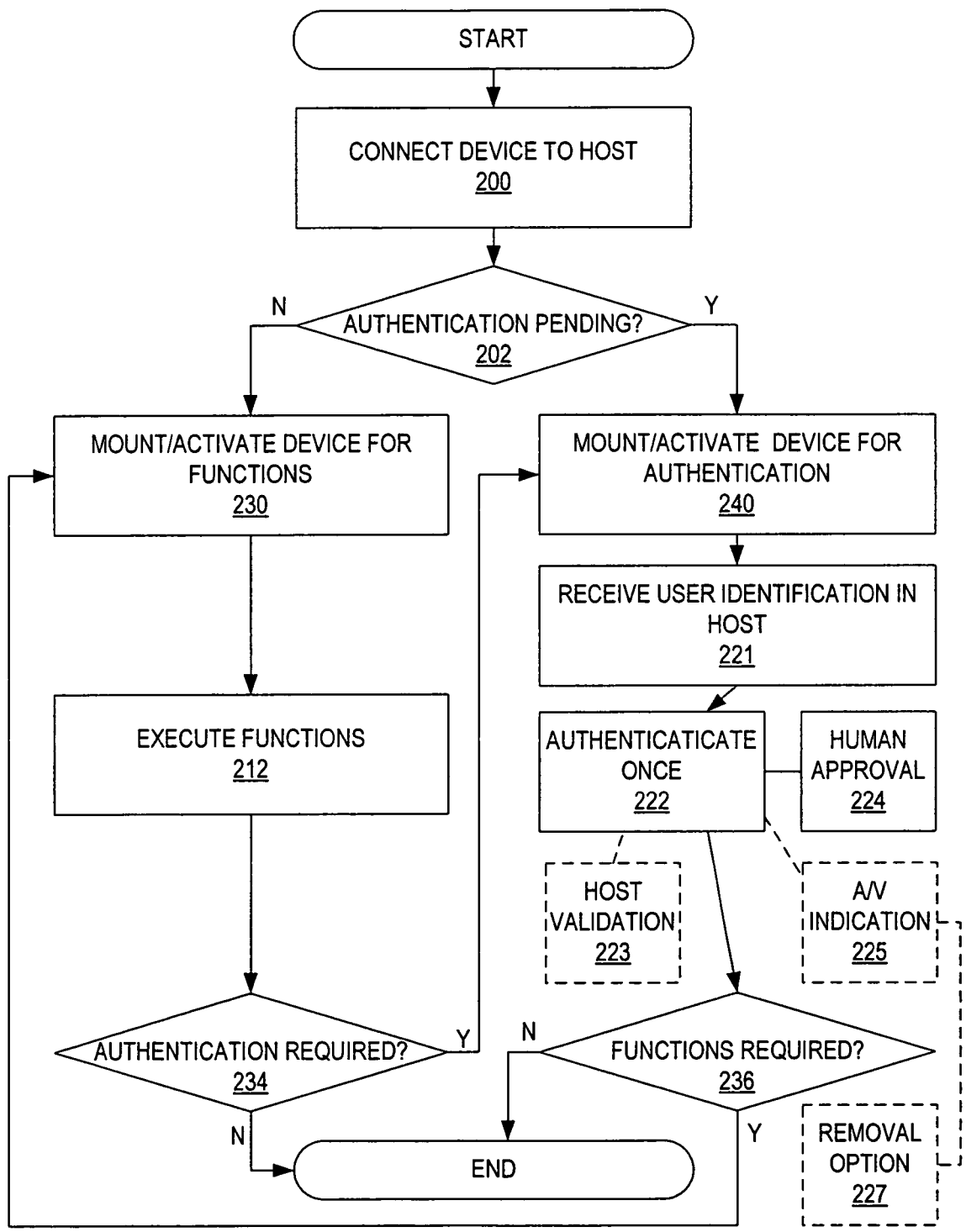
Figure 5:
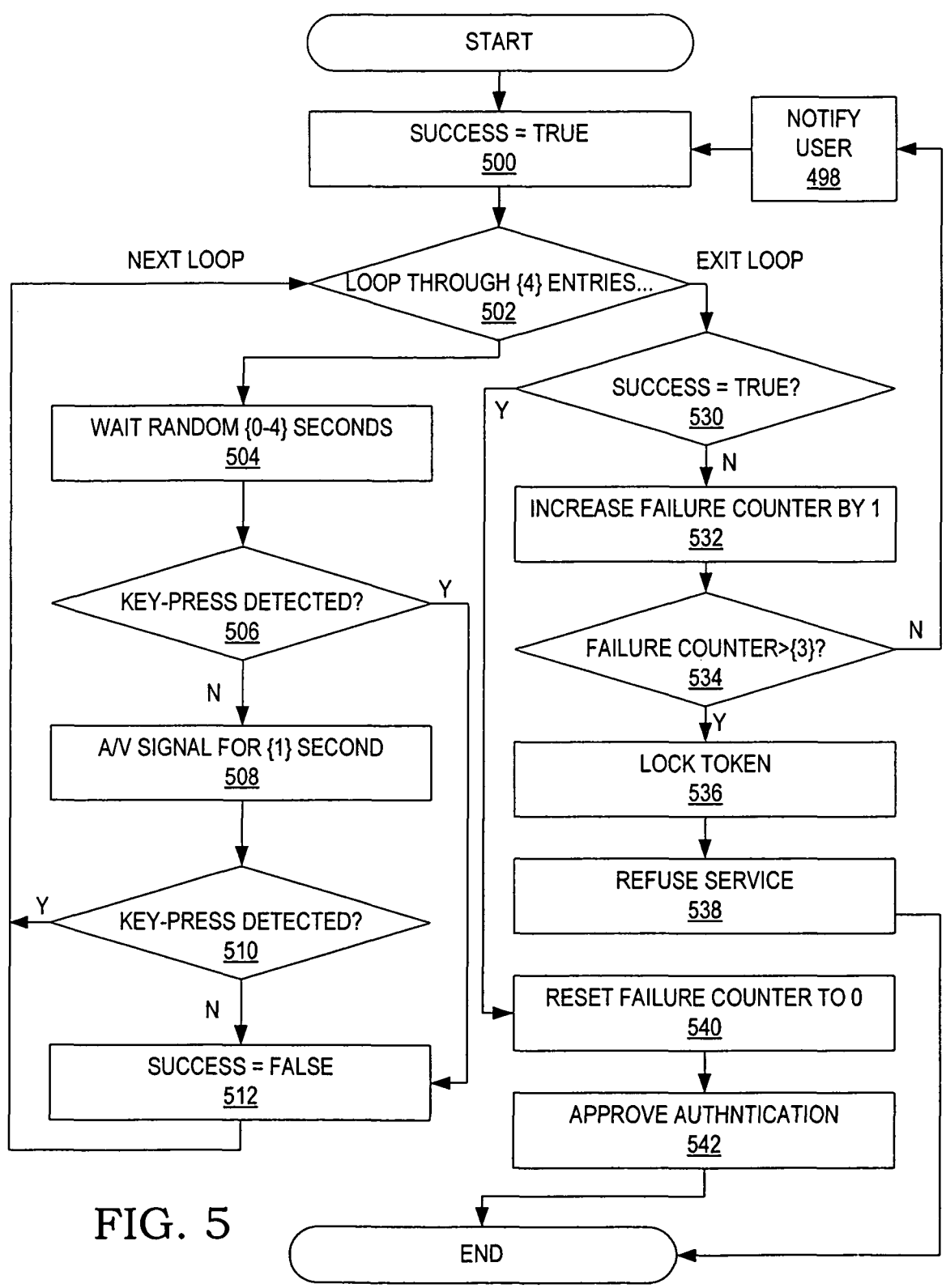
FIG. 5 is a flow chart of a preferred method of mandatory human approval.

FIG. 2A is a flow chart of an alternative method of operating system 100 that lacks the requirement of physically removing multipurpose portable device 110 from host 150 between authentication and other functional sessions. All steps are similar to those of FIG. 2, except the following: step 224 of express human approval, by pressing button 120 or applying the method of FIG. 5, is mandatory; mounting for either mode in steps 230 and 240 is logical under the control of controller 115 and does not require physical removal of multipurpose portable device 110 from host 150; and switching from one mode to another is steps 234 and 236 is made by logical remounting rather than by physical remounting. It will be noted that instead of using logical mounting, both authentication token 112 and functions 114 could remain mounted concurrently, while controller 115 just switches their functions. Therefore, the word "activate" appears in blocks 230 and 240 as an alternative to the word "mount". It will be appreciated that since human approval 224 is mandatory under the embodiment of FIG. 2A, only a single authentication can take place per approval.

Figure 3:
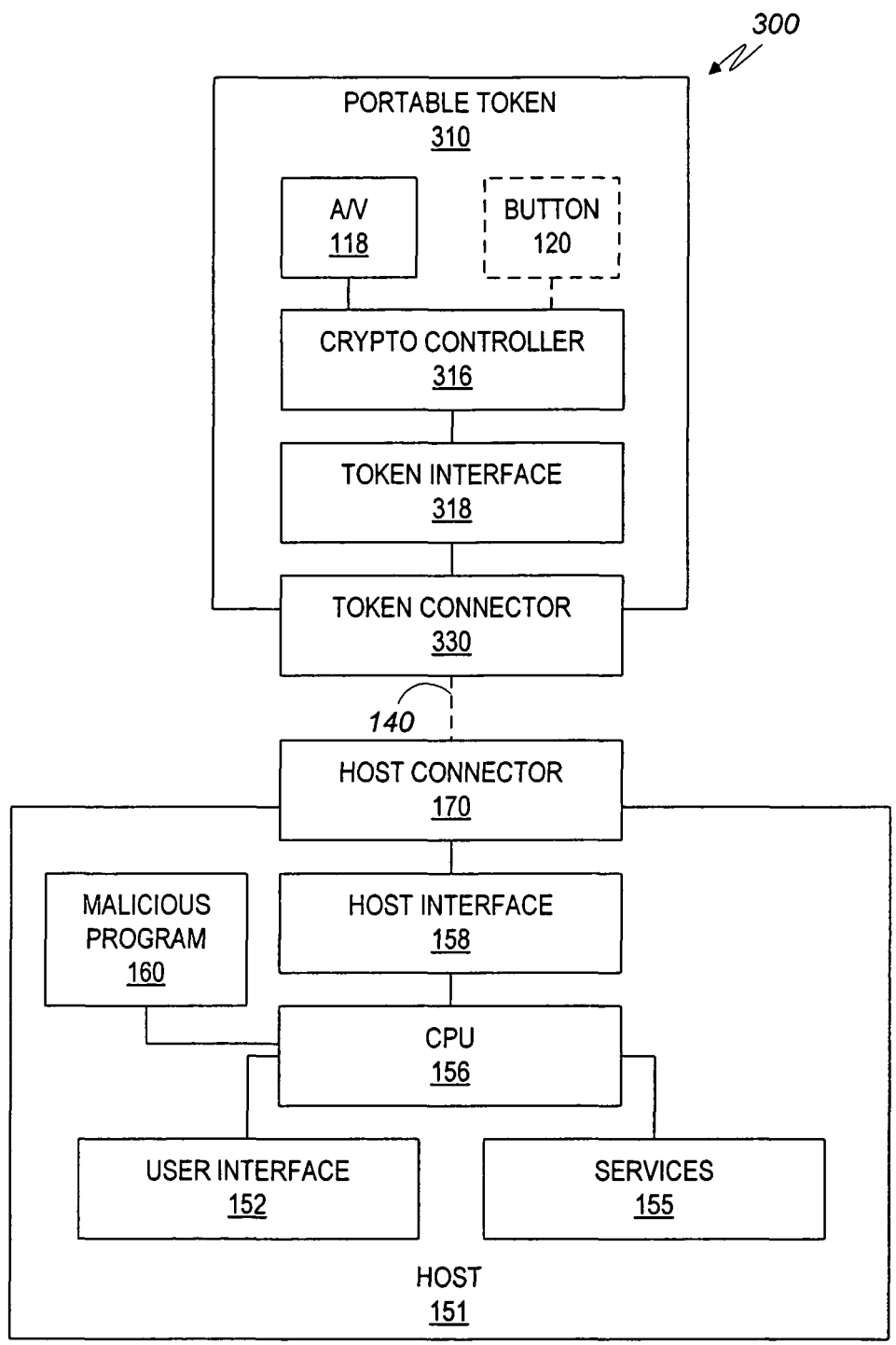
FIG. 3 is a high-level block diagram of another system of the present invention.

FIG. 3 illustrates another preferred system 300 of the present invention, in which multipurpose portable device 110 of FIG. 1 is replaced by a single-purpose portable token 310 that has no functionality other than authentication. A host 151 is similar to host 150, except that services 155 do not need to include any service that requires extra functions 114 of multipurpose portable device 110. A token interface 318 and a token connector 330 are similar to device interface 116 and device connector 130, respectively, of FIG. 1. A crypto-controller 316 controls the operation of portable token 310, and indicator 118 and button 120 are the same as their counterparts in FIG. 1.

Figure 4:
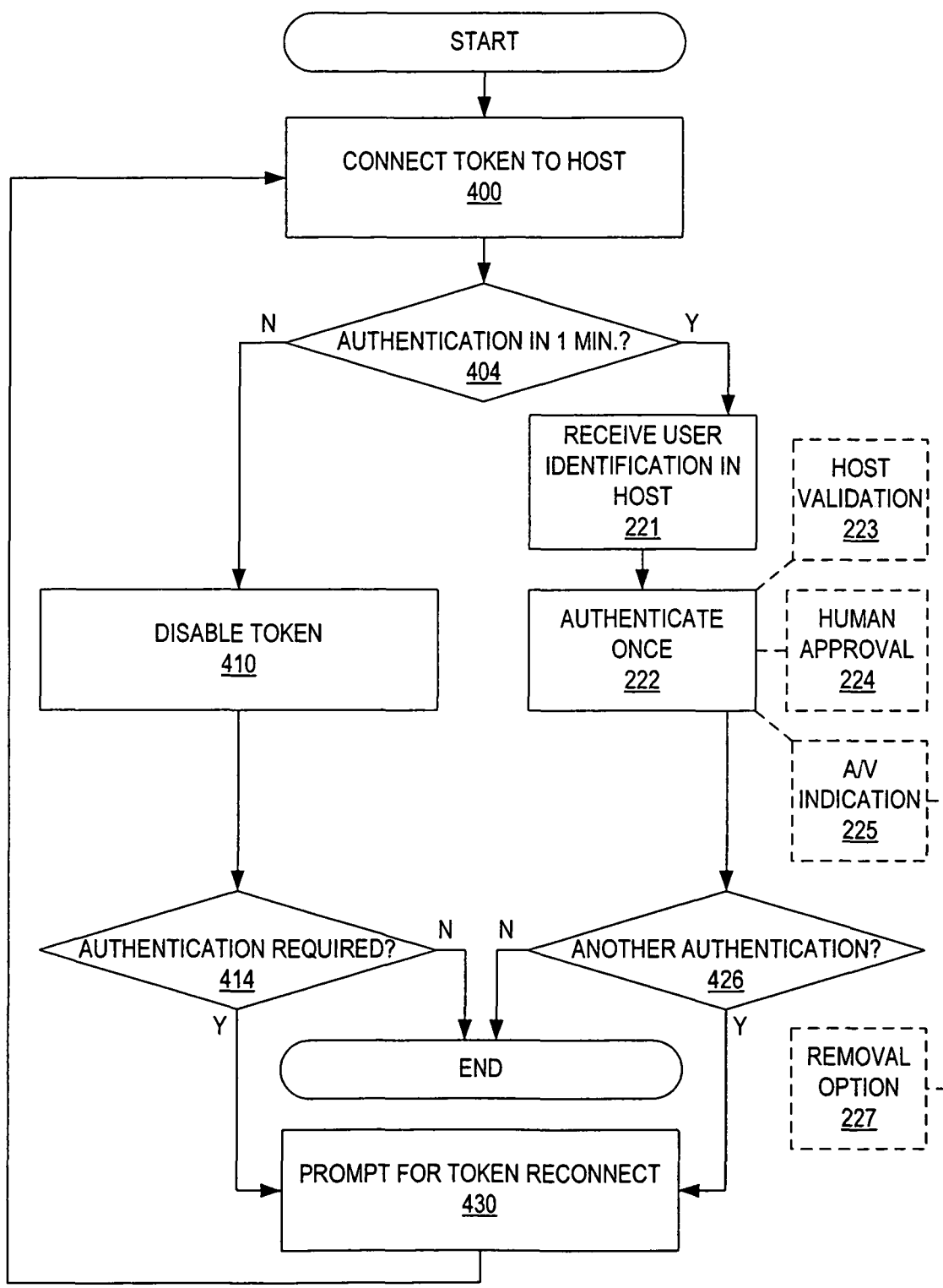
FIGS. 4 and 4A are flow charts of two methods of operating the system of FIG. 3.

FIG. 4 is a flowchart of the operation of system 300 of FIG. 3. In step 400, portable token 310 is operationally connected to host 151. Since the sole purpose of portable token 310 is authentication, it is presumed that an actual authentication operation will take place within a predetermined time interval such as one minute, as checked in step 404. If authentication is invoked within this time interval, then in steps 221 and 222 a single authentication operation takes place similar to that of FIG. 2, with optional host validation 223, human approval 224 and audiovisual indication 225 as in FIG. 2. If, in step 426 the user wishes to make another authentication session through one of the services 155 of FIG. 3, s/he is prompted in step 430 to physically disconnect and reconnect portable token 310 to host 151. If in step 404 authentication was not invoked within the predetermined time interval of (say) one minute, then in step 410 the token is disabled. In case of a need for authentication in step 414, the user is prompted in step 430 to physically disconnect and reconnect portable token 310 to host 151.

Figure 4A:
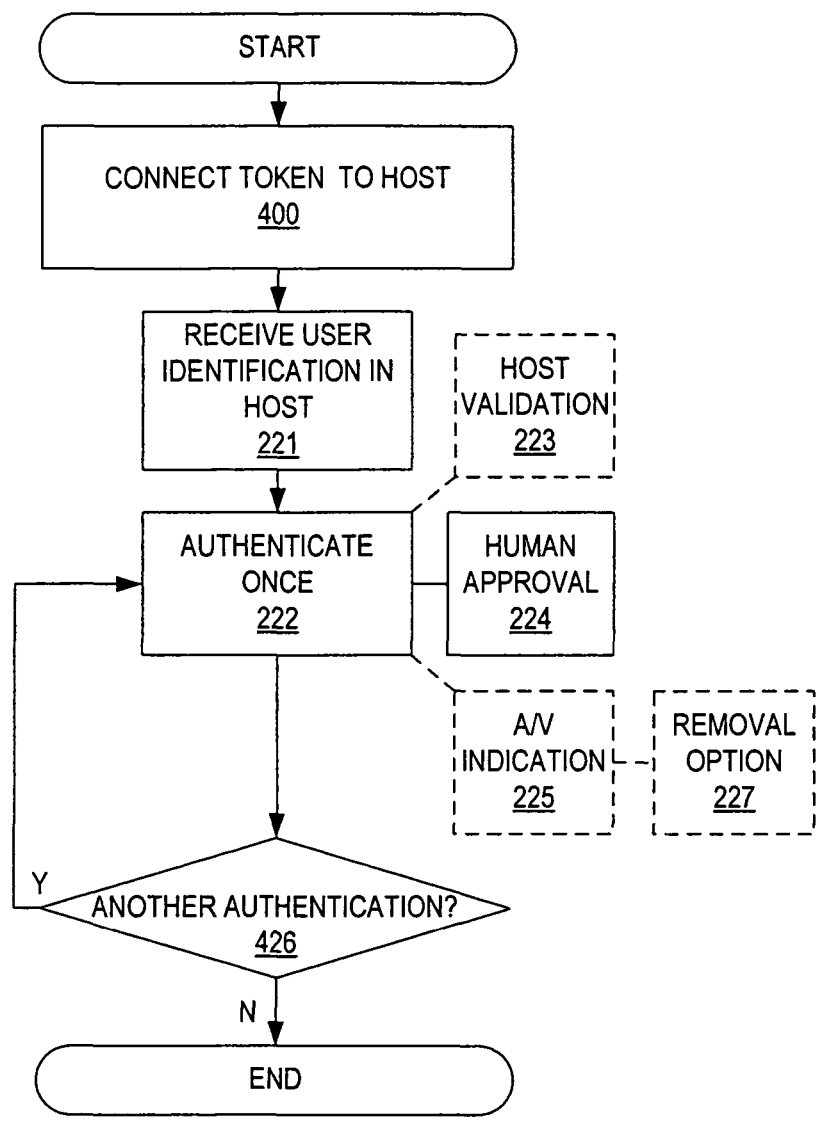

FIG. 4A is a flow chart of an alternative method, of operating system 300, that lacks the requirement of physically removing portable token 310 from host 151 between authentication sessions. In step 400 portable token 310 is connected to host 151. Steps 221, 222, 223, 224 and 225 are the same as in FIG. 4, except that step 224 of express human approval is mandatory. Step 426 may lead to another authentication operation in step 222 with a mandatory express human approval 222, and so on (with no need to repeat the user identification of step 221).

FIG. 5 is a flowchart of a preferred method for mandatory human approval 224 of FIGS. 2, 2A, 4 and 4A, alternative to pressing button 120. An application that detects key presses runs on host 150 or host 151 and instantly reports to a connected multipurpose portable device 110 or portable token 310 whenever a key is pressed. The goal is to enable using user interface 152 (e.g. a conventional keyboard) for user approval, in a way that cannot be replicated by malicious program 160. This is done by requiring the user to press a key on user interface 152 synchronously with signals received from audiovisual indicator 118. Since a human user is aware of the signals, while malicious program 160 is blind to the signals (the signals are generated autonomously by controller 115 or by crypto-controller 316), the presence of a human operator is confirmed. The illustrated exemplary procedure requests that the user presses a key on the host computer's user interface 152 four successive times synchronously with a signal received from indicator 118. If the user misses any key press within the first four-press session, s/he will have another two chances for four key presses. If s/he fails in three consecutive sessions, the token locks itself. Unlocking a locked token requires a definitive manual action by a human user, such as a visit to a service bureau. This requirement is provided to prevent a malicious program from repeatedly attempting to randomly guess the proper timing of key presses even across sessions, until the proper timing is guessed. For tracking failures, a failure counter that forms part of controller 115 (FIG. 1) or of crypto-controller 316 (FIG. 3) is provided; this failure counter is preset to zero upon manufacturing, personalization, or any other definitive manual action by a user that is made in a trusted computer, e.g. in a service bureau, that presumably cannot be reached by a malicious program. Also, the failure counter is reset to zero upon successful key press series, as described in step 540 below.

Thus, a success flag is set to logical true in step 500, followed by looping through a session of four key press entries in step 502. In step 504 controller 115 or crypto-controller 316 generates a random number between 0 and 4 and waits this number of seconds while indicator 118 is off. If during this waiting time a key press is detected in step 506, then the success flag is set to false. Then, in step 508, a signal is generated by controller 115 or crypto-controller 316 through indicator 118, and in step 510 a key press is expected during the signal duration. If the key press is detected, the four key-presses session loops back to step 502; otherwise the success flag is set to false in a step 512, followed by continuing the loop in step 502. When all four sessions conclude, the loop is exited toward step 530, where the success flag is examined. Only if all four key presses at user interface 152 were synchronous with the signals from indicator 118 does the success flag remains true, which leads to resetting a failure counter included in controller 115 or in crypto-controller 316 to zero in step 540, and then approving authentication in step 542, i.e. leading to the execution of step 222 in any of FIGS. 2, 2A, 4 and 4A. In case of even one miss in synchronizing a key press and a signal, loop 502 ends up in step 530, with success=false, which leads to increasing the previously-mentioned failure counter by 1 in step 532. If the failure counter has exceeded the permissible failures number of, for example, 3, then step 534 leads controller 115 or crypto-controller 316 to lock itself in step 536 and to refuse service in step 538 (i.e. no authentication is made in step 222 in any of FIGS. 2, 2A, 4 and 4A). However, in case of up to two previous failures, step 534 leads to generating a message in step 498 through indicator 118 and/or user interface 152, encouraging the user to have another try at step 500.

It will be noted that in all variations described above, a mandatory manual step that can be performed only by a human is required to prevent a malicious program from completing an authentication by itself. Also, such steps are unusual in the sense that they are required for authentication and they make no sense in any other context. The examples presented of such a manual step include: reconnection of a device to a host, pressing a special-purpose button, sending a warning signal that allows the user to disconnect the token before an illegitimate authentication takes place, connecting a token to a host in a timely manner, and pressing a key of the host synchronously with audiovisual signals received from the token.

Thus, the focus of the present invention is on confirming that a human operator is actually present and in control, for preventing a malicious program from operating a token by itself. The human operator needs to be separately identified through presenting a PIN, password or biological attribute to the host. The requirement for the user identification is not coming to protect the token against the malicious program (which is presumed to have intercepted the PIN, the password or the biometric signature) but against loss or theft. It is thus implicitly assumed that a criminal that attempts to generate false transactions with a found or stolen token is not the same criminal who secretly installs a malicious program on a host used by the token's owner. A criminal who installs a malicious program in a host and subsequently comes into possession of a token that has been used on the host can easily pretend to be the owner of the token. The present invention is powerless against such a scenario; but such a scenario is sufficiently unlikely that the general usefulness of the present invention is preserved.

While the invention has been described with respect to a limited number of embodiments, it will be appreciated that many variations, modifications and other applications of the invention may be made.

What is claimed is:

1. A method of confirming by a peripheral device, which is operationally connected to a host, that a user is interfacing with the host in person, the method comprising:
performing by the peripheral device:
generating at least one output at a peripheral device user output on the peripheral device;
receiving a report from the host on user input that is input via the host;
determining that the report was received within a predetermined time since generating the at least one output;
confirming, in response to the received report and in response to determining that the report was received within the predetermined time since generating the at least one output, that the user is interfacing with the host in person; and
in response to confirming that the user is interfacing with the host in person:
generating authentication token data; and
sending, to the host, the authentication token data.

2. The method of claim 1, wherein generating the at least one output involves generating a plurality of outputs.

3. The method of claim 2, wherein the plurality of outputs are distributed randomly in time.

4. The method of claim 1, wherein generating the at least one output comprises generating an audiovisual signal.

5. The method of claim 1, wherein:
the peripheral device comprises multiple functionalities; and
at least one of the functionalities comprises an authentication functionality configured to generate the authentication token data.

6. The method of claim 1, wherein the peripheral device comprises an authentication functionality configured to generate the authentication token data.

7. A method of confirming by a peripheral device, which is operationally connected to a host, that a user is interfacing with the host in person, the method comprising:
performing by the peripheral device:
generating an output
receiving a report from the host on user input that is input via the host;
determining that the report was received within a predetermined time since generating the output;
confirming, in response to the received report and in response to determining that the report was received within the predetermined time since generating the output, that the user is interfacing with the host in person; and in response to confirming that the user is interfacing with the host in person:
    generating authentication token data; and
    sending, to the host, the authentication token data.

8. The method of claim 7, wherein generating the output involves generating a plurality of outputs.

9. The method of claim 8, wherein the plurality of outputs are distributed randomly in time.

10. The method of claim 7, wherein generating the output comprises generating an audiovisual signal.

11. The method of claim 7, wherein:
    the peripheral device comprises multiple functionalities; and
    at least one of the functionalities comprises an authentication functionality configured to generate the authentication token data.

12. The method of claim 7, wherein the peripheral device comprises an authentication functionality configured to generate the authentication token data.

\* \* \* \* \*